(12) United States Patent
Kulshreshtha et al.

(10) Patent No.: US 12,647,330 B2
(45) Date of Patent: Jun. 2, 2026

(54) CONFIGURATION FOR PROVIDING A COMMUNICATION SERVICE

(71) Applicant: Oracle International Corporation, Redwood City, CA (US)

(72) Inventors: Kinshuk Kulshreshtha, Kitchener (CA); Bhavana Batchu, Bangalore (IN); Mujahid Ur Rahm Syed, London (CA)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/462,500

(22) Filed: Sep. 7, 2023

(65) Prior Publication Data

US 2025/0088433 A1    Mar. 13, 2025

(51) Int. Cl.
H04L 41/5006 (2022.01)
H04L 41/5019 (2022.01)
(52) U.S. Cl.
CPC ...... H04L 41/5006 (2013.01); H04L 41/5019 (2013.01)
(58) Field of Classification Search
CPC ..... H04L 41/12; H04L 41/0813; H04L 67/01; H04L 67/10; H04L 41/50; H04L 41/509; H04L 43/08; H04L 41/0823; H04L 41/0869; H04L 43/04; H04L 43/10; H04L 67/51; H04L 47/83; H04L 61/4511; H04L 41/0893; H04L 47/70; H04L 41/5041;
(Continued)

(56) References Cited

U.S. PATENT DOCUMENTS 6,834,303 B1 * 12/2004 Garg ...................... H04L 67/51
                                                                370/254
7,310,673 B2 * 12/2007 Zhu ......................... H04L 67/51
                                                                709/226
(Continued)

FOREIGN PATENT DOCUMENTS

CN     114648281 A     6/2022
CN     110740053 B     7/2022
EP       3639474 B1     8/2022

OTHER PUBLICATIONS

International Search Report & Written Opinion for PCT/US2024/045619, mailed Nov. 22, 2024, 14 pages.

*Primary Examiner* — Djenane M Bayard

(57) ABSTRACT

The technology disclosed herein streamlines the design and provision of communication services supplied by a communication service provider. In a particular example, a method includes receiving service design parameters for a communication service provided by the communication service provider and identifying a root node in a service design catalog corresponding to at least a first parameter of the service design parameters. The method further includes creating a service design by traversing from the root node through one or more subsequent nodes defined by the service design catalog corresponding to one or more second parameters of the service design parameters until one or more leaf nodes indicated by the service design catalog are reached. The method also includes configuring resources corresponding to nodes traversed in the service design in accordance with the service design and providing the communication service via the resources.

20 Claims, 7 Drawing Sheets

100

(58) Field of Classification Search
　　CPC ....... H04L 67/568; H04L 67/60; H04L 65/60;
　　　　　　　　H04L 41/0816; H04L 61/10; H04L
　　　　　　　61/2503; H04L 61/4535; H04L 61/58;
　　　　　　　　H04L 65/403; H04L 67/06; H04L
　　　　　67/1078; H04L 67/2885; H04L 67/289;
　　　　　　　　　　　　　　　　　　H04L 67/55
　　See application file for complete search history.

(56)　　　　　　　　References Cited

U.S. PATENT DOCUMENTS

2006/0293936　A1 *　12/2006　Breiter ................... G06Q 10/10
　　　　　　　　　　　　　　　　　　　　　705/7.25
2010/0114618　A1 *　　5/2010　Wilcock ........... G06Q 10/06375
　　　　　　　　　　　　　　　　　　　　　705/348
2016/0119435　A1 *　　4/2016　Ben Fredj ............... H04L 67/51
　　　　　　　　　　　　　　　　　　　　　370/310
2019/0392070　A1 *　12/2019　Johnson ............... G06Q 10/067

* cited by examiner

200

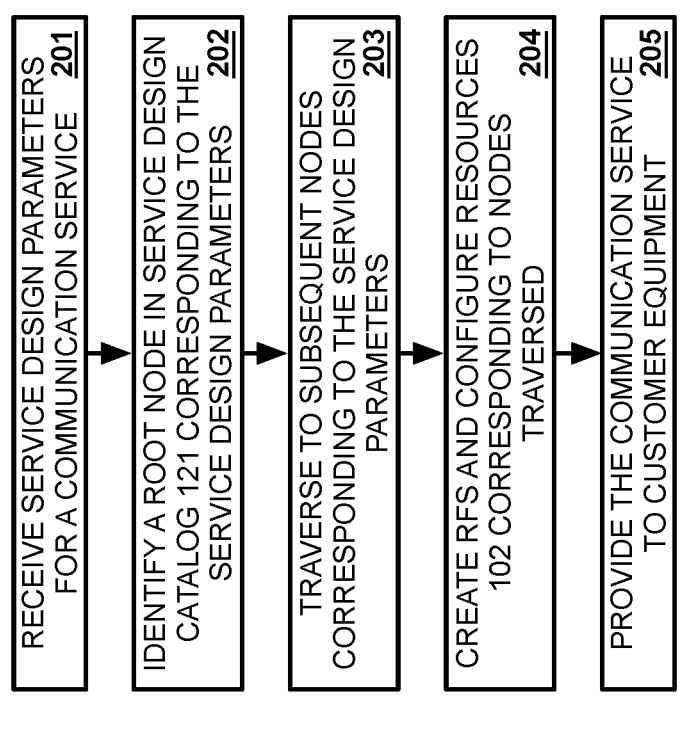

RECEIVE SERVICE DESIGN PARAMETERS FOR A COMMUNICATION SERVICE  201

IDENTIFY A ROOT NODE IN SERVICE DESIGN CATALOG 121 CORRESPONDING TO THE SERVICE DESIGN PARAMETERS  202

TRAVERSE TO SUBSEQUENT NODES CORRESPONDING TO THE SERVICE DESIGN PARAMETERS  203

CREATE RFS AND CONFIGURE RESOURCES 102 CORRESPONDING TO NODES TRAVERSED  204

PROVIDE THE COMMUNICATION SERVICE TO CUSTOMER EQUIPMENT  205

FIGURE 2

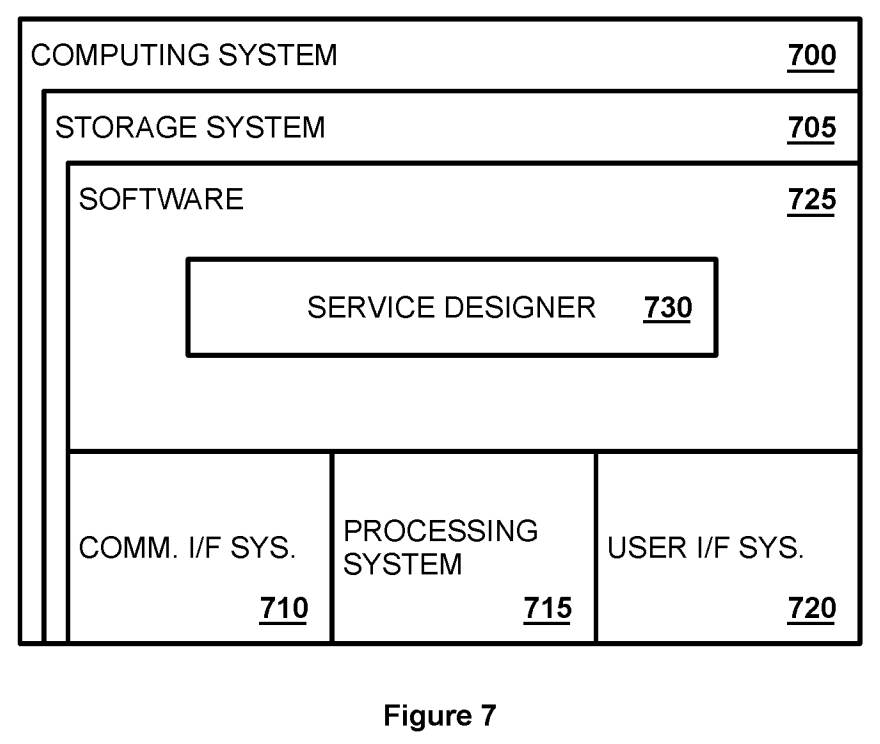

COMPUTING SYSTEM 700

STORAGE SYSTEM 705

SOFTWARE 725

SERVICE DESIGNER 730

COMM. I/F SYS. 710

PROCESSING SYSTEM 715

USER I/F SYS. 720

Figure 7

CONFIGURATION FOR PROVIDING A COMMUNICATION SERVICE

BACKGROUND

When a customer contacts a communication service provider to request a new communication service, that new communication service needs to be designed at the communication service provider to achieve the customer's desired results. The communication service provider may include or choose from many possible options and features for the communication service that will be incorporated into the service design. As such, there may be many different combinations of those options and features that any one service design may include. Customizing and provisioning a service design based on an individual customer's requirements requires technical expertise and time to ensure resources of the communication service provider are configured to provide the requested service in the desired manner.

SUMMARY

The technology disclosed herein streamlines the design and provision of communication services supplied by a communication service provider. In a particular example, a method includes receiving service design parameters for a communication service provided by the communication service provider and identifying a root node in a service design catalog corresponding to the service design parameters. The method further includes creating a service design by traversing from the root node through one or more subsequent child nodes defined by the service design catalog based on the service design parameters until one or more leaf nodes indicated by the service design catalog are reached. The method also includes configuring one or more resource facing services and resources corresponding to nodes traversed in the service design in accordance with the service design and providing the communication service via the resources after configuration.

In other examples, an apparatus performs the above-recited method and program instructions stored on computer readable storage media direct a processing system to perform the above-recited method.

BRIEF DESCRIPTION OF THE DRAWINGS

FIG. 2 illustrates an operation to design and provide a communication service.

FIG. 7 illustrates a computing system for designing and providing a communication service.

DETAILED DESCRIPTION

The service designer described below uses policies in a service design catalog to automatically design a communication service based on design parameters. A single user can provide the design parameters and create the service model without having to involve other technical experts with knowledge of specific resources used to implement the service. For example, a communication service provider may provide broadband internet service to different customers. Each customer may have different requirements (i.e., parameters). One customer may require one type of physical connection and a particular data transfer speed while another customer may require a different type of physical connection and a different data transfer speed. Other more granular parameters may also be included in a particular service design. The service designer steps through various services, components, and resources of the communication service provider based on a customer's parameters to create a tree of connected nodes representing the service design.

Figure 1:
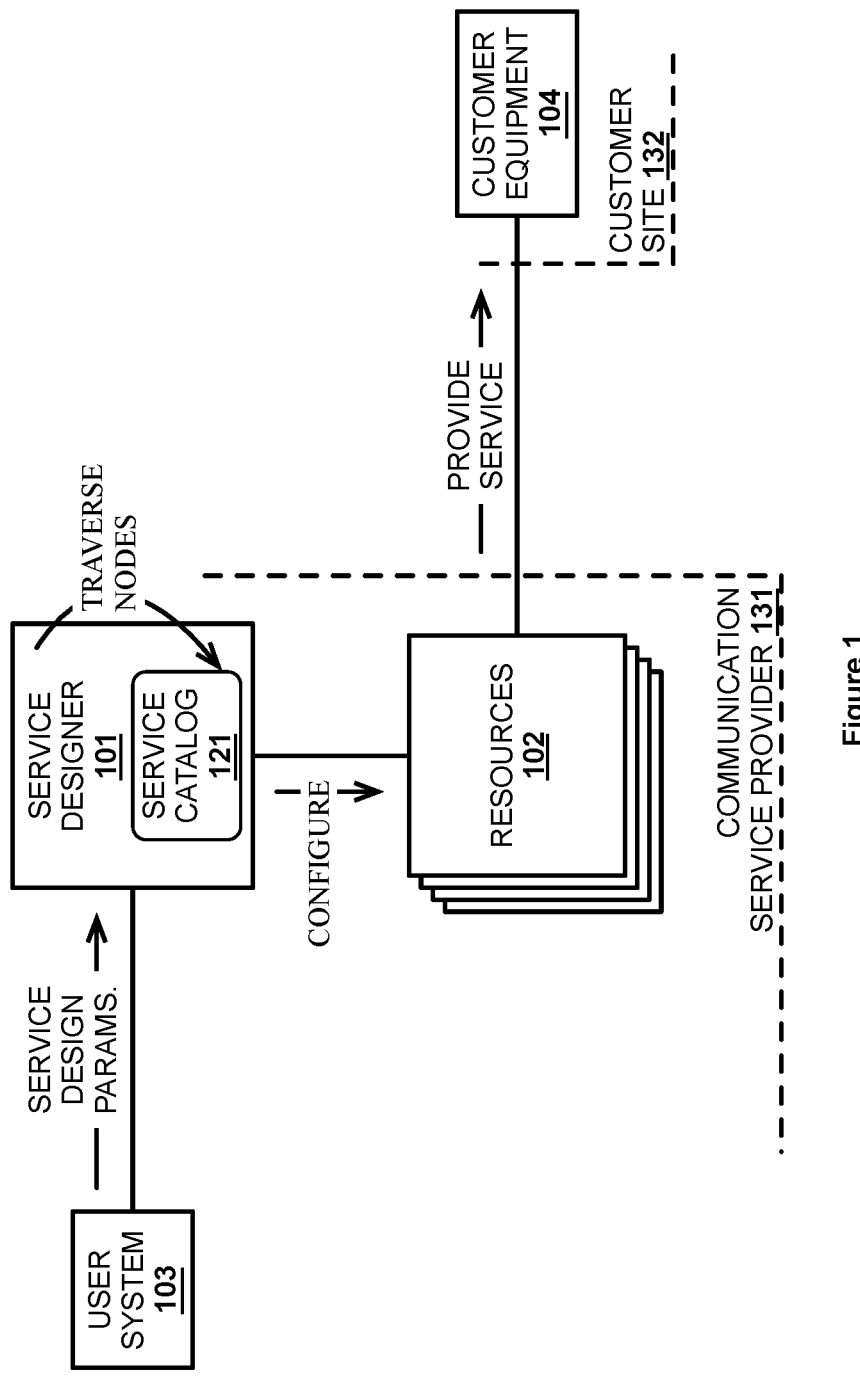
FIG. 1 illustrates an implementation for designing and providing a communication service.

FIG. 1 illustrates implementation 100 for designing and providing a communication service. Implementation 100 includes service designer 101, resources 102, user system 103, and customer equipment 104. Service designer 101, resources 102, and user system 103 are part of communication service provider 131 and may be co-located or may be distributed across multiple geographic locations (e.g., multiple facilities operated by communication service provider 131). Customer equipment 104 is located at customer site 132 (e.g., a customer's home, office, or other physical location where a customer may desire service from communication service provider 131). Wired and/or wireless communication links connect service designer 101, resources 102, user system 103, and customer equipment 104. While shown as direct links, the communication links may include intervening systems, network, and/or devices.

In operation, service designer 101 is a computing system that handles the design of communication services that will be implemented using resources 102. Service designer 101 may be a physical server, or virtualized computing system (e.g., virtual machine), executing on physical hardware. In some examples, the functionality of service designer 101 may be incorporated into user system 103. In this example, user system 103 is operated by a user (e.g., an employee of communication service provider 131) to initiate the design of communication services. User system 103 may be a desktop computer, laptop computer, tablet, smartphone, or some other type of user operable computing device. User system 103 provides service design parameters to service designer 101 and service designer 101 uses service catalog 121 to create a service design based on the service design parameters. The service design parameters may be received from a user operating user system 103. Service catalog 121 includes design policies that indicate a design model for services provided by communication service provider 131. The design policies indicate which of resources 102, which components of resources 102, which settings for resources 102, or any other element necessary to design a particular service, are needed to implement a service from communication service provider 131. When the policies indicate multiple options for a feature (e.g., a minimum or maximum connection speed, desired Quality of Service, etc.), then the service design parameters indicate which option should be selected for the service design. In some examples, a default option may be selected if the service design parameters do not indicate a desired option.

Once the service is designed, service designer 101 may also configure resources 102 in accordance with the service design. The configured ones of resources 102 then provide the service to customer equipment 104. Customer equipment 104 may be any computing system capable of receiving a service from communication service provider 131. For instance, if the service is a broadband internet service, then customer equipment 104 may include a modem. If the service is an application service (e.g., email, media streaming, etc.) then customer equipment 104 may include a user system and customer site 132 may include a location where customer equipment 104 happens to be.

FIG. 2 illustrates operation 200 to design and provide a communication service. In operation 200, service designer 101 receives service design parameters for a communication service provided by communication service provider 131 (step 201). In this example, the service design parameters are received from user system 103 but may be received from other sources in other examples. A user of user system 103 may be in communication with a customer associated with customer site 132 (e.g., a person ordering a service for their home/business). The service may be any type of communication service that may be provided by communication service provider 131, such as internet access or an application service (e.g., email). Based on the user's communication with the customer, the user inputs the service design parameters to create the desired service on behalf of the customer. The service design parameters are passed from user system 103 to service designer 101 for service designer 101 to create the service design based on the service design parameters. Service designer 101 may provide a web-browser interface at user system 103 to receive the service design parameters from the user or another application may be executing on user system 103 to provide a user interface into which the service design parameters can be received from the user before being passed to service designer 101. The service design parameters may be received all at once or may be received in stages as service designer 101 creates the service design. For example, when service designer 101 reaches a node that requires additional service design parameters to proceed, service designer 101 may provide a user interface to the user via user system 103 requesting the user to input the additional service design parameters.

Service designer 101 creates the service design by identifying a root node in service design catalog 121 (step 202). The root node corresponds to at least one parameter of the service design parameters. Policies in service catalog 121 indicate which parameters of the service design parameters correspond to which root nodes. Typically, the root node will be a node representing the service requested by the customer as indicated by the service design parameters. For instance, if the service is broadband internet access for the customer, the root node will indicate that a broadband internet service (one service design parameter) is to be provided to customer site 132 (another service design parameter). The service design parameters used to identify the root node may be included in the service design parameters from a service order from the customer. At this point in the operation, the specific customer equipment 104 may not yet be indicated in the service design (e.g., because customer equipment 104 may not yet be supplied to the customer). Since this is a new service design, service designer 101 may identify the root node by creating a root node corresponding to the relevant service design parameters.

Creation of the service design continues with service designer 101 traversing from the root node through one or more subsequent child nodes defined by service design catalog 121 based on the service design parameters (step 203). Each child node represents an element of the service corresponding to the root node. For example, a broadband internet service may include a node for the type of physical infrastructure that will provide the service, a node for particular components of that infrastructure, nodes for various settings of the components, or nodes for some other aspect of providing the service. The traversal continues until one or more leaf nodes indicated by service catalog 121 are reached. A leaf node in this case occurs when no additional nodes can be added to a particular branch of the service design. For each node, policies in service catalog 121 define which child node(s) (or none at all if a leaf is reached) should branch therefrom and which of the service design parameters need to propagate to those children to design the service. In some cases, a child node may have already been created in another branch of the service design and can merely be selected during the traversal. In other cases, a child node may not yet be created and service designer 101 will create the child node indicated by the policies in service catalog 121. As mentioned above, in some examples, service designer 101 may request service design parameters applicable to each node as the node is reached. The user interface presented by user system 103 to request the applicable service design parameters may effectively step the user of user system 103 through a process to create the service design. For instance, the user interface may request first parameters and, upon submission of the first parameters, a new view may be presented requesting second parameters based on the next node identified by service designer 101 during the traversal.

Upon the service design reaching leaf nodes on all of one or more branches, the service design is complete. In some examples, service designer 101 may present the complete service design to the user via user system 103. In this example, service designer 101 configures those of resources 102 corresponding to nodes traversed in the service design in accordance with the service design (step 204). A resourced facing service is also configured to bind to the configured resources with respect to the requested service. For example, a network router of resources 102 may be configured to provide internet access as part of a broadband internet service to a particular IP address that is assigned to customer equipment 104 and may be configured to provide a certain minimum and/or maximum data transfer speed, as defined by the service design in accordance with the service design parameters. Once configured, the communication service is provided via the configured resources 102 (step 205). In some examples, prior to configuring resources 102 or providing the service, the service design may be implemented in a test environment in hopes of identifying issues that may be present in the service design prior to implementing the service design in resources 102.

Figure 3:
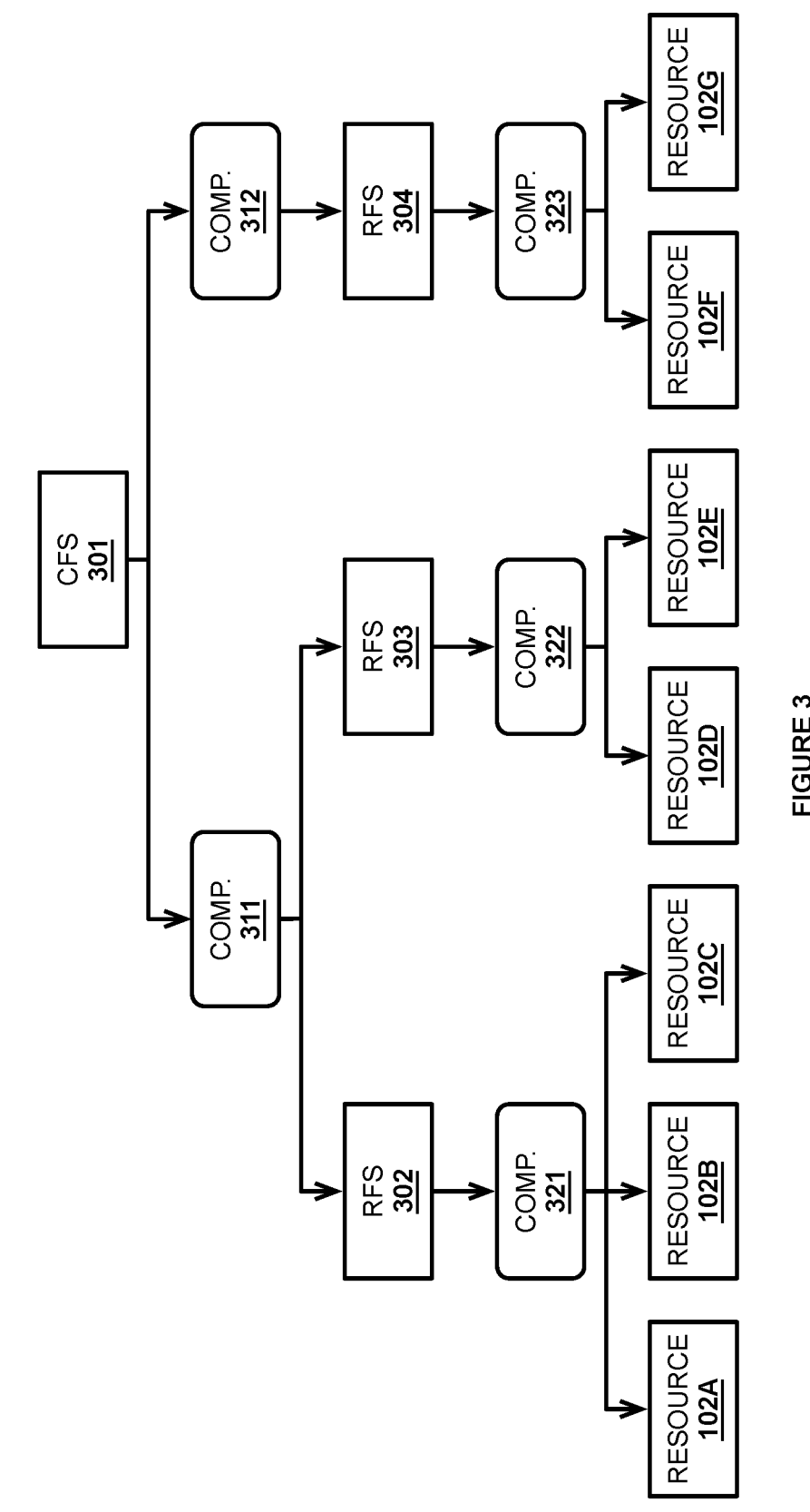
FIG. 3 illustrates a service catalog for designing and providing a communication service.

FIG. 3 illustrates service catalog 300 for designing and providing a communication service. Service catalog 300 is an example of service catalog 121. While illustrated as a tree of nodes, service catalog 121 is not necessarily stored in service designer 101 as a tree structure. Rather, service catalog 121 is indicative of possible nodes and traversal paths that service designer 101 could potentially take when creating a service design. Specifically, design policies that make up service catalog 300 allow for the paths and nodes shown in service catalog 300. Which specific nodes and paths are taken when creating a service design depend on how the policies apply to service design parameters received by service designer 101 for the service being designed. In this example, components, such as components 311-312, are shown as separate nodes. In other examples, components may be considered attributes of the node from which they branch. Also, the number of nodes and branches shown in service catalog 300 are merely exemplary. Other examples may include different numbers of nodes and paths depending on the policies affecting the service catalog.

Service catalog 300 includes a node representing customer facing service (CFS) 301. Other examples may include nodes representing additional customer facing services. Customer facing service 301 includes two components 311 and 312, which in turn branch to three resource facing services (RFSs) 302-304. In one example, customer facing service 301 may be a Voice over Internet Protocol (VOIP) phone service and that VOIP service may include a broadband internet access component and a voice communication service that will operate over the broadband internet access. Resource facing service 302-304 are specific high-level services that will be implemented by resources 102 to provide the requested service. In this example, each resource facing service 302-304 includes respective components 321-323 but other examples may include multiple components for a give resource facing service. Components 321-323 then branch to respective resources 102A-G of resources 102.

Figure 4:
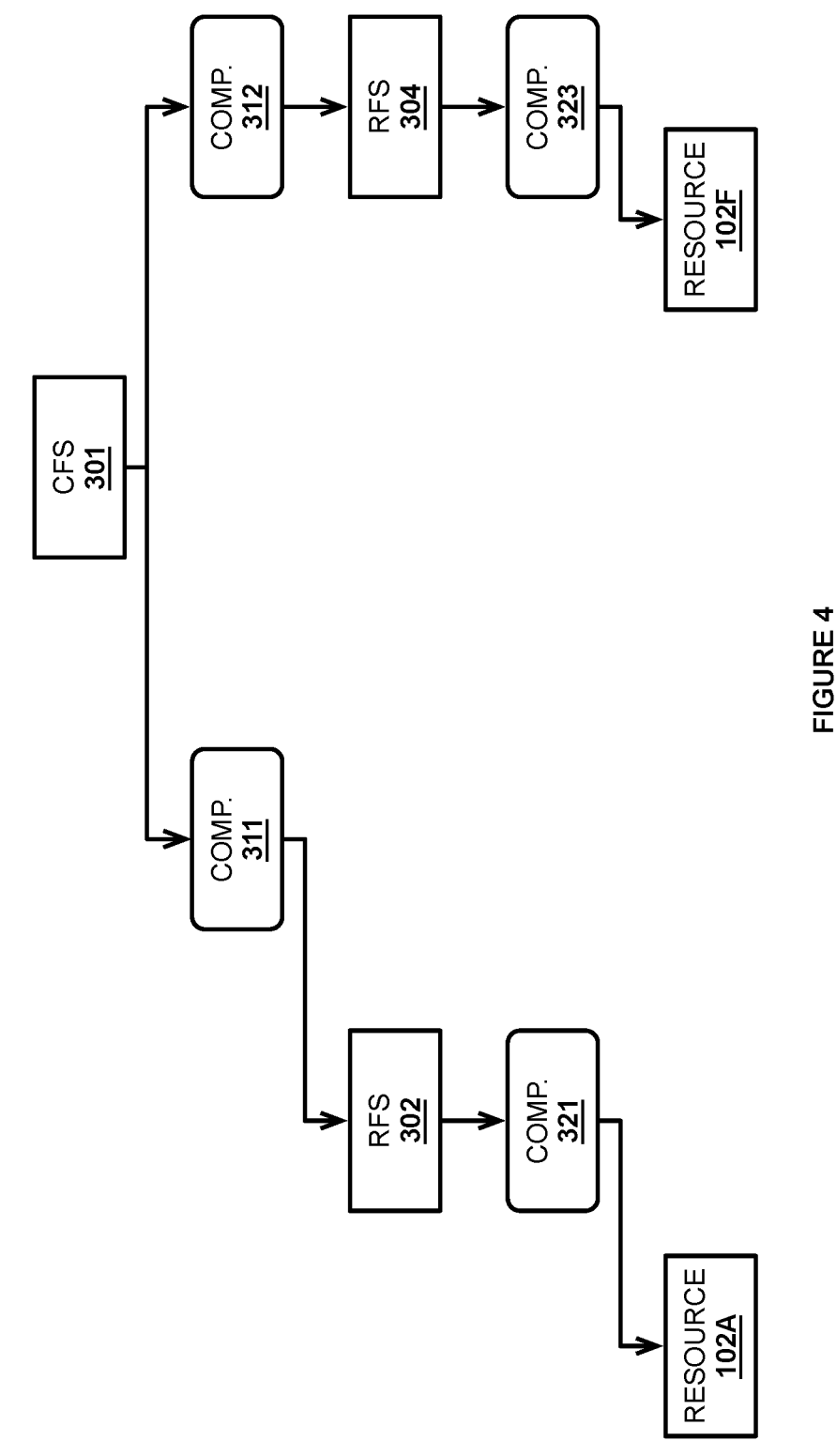
FIG. 4 illustrates a service design for designing and providing a communication service.

FIG. 4 illustrates service design 400 for designing and providing a communication service. Service design 400 is an example service design created from service catalog 300. Service design parameters received by service designer 101 for a new service, when applied to the policies of service catalog 300, result in service design 400. In this example, the policies indicated two paths for service design 400 from customer facing service 301. One path goes through component 311, resource facing service 302, and component 321 to resource 102A as a leaf. The other path goes through component 312, resource facing service 304, and component 323 to resources 102F as a leaf. To initiate provision of the service represented by service design 400, service designer 101 configures resource 102A and 102F.

In addition to configuring resource 102A and resource 102F, service designer 101 may create instances of customer facing service 301 with components 311-312 and resource facing services 302 and 304 with components 321 and 323, respectively. The instances may be initialized on computing systems, such as physical or virtualized servers, within communication service provider 131. The instances may be tasked with configuring elements lower on service design 400. For example, customer facing service 301 may be instructed to create an instance for resource facing service 302, which may in turn configure resource 102A.

Figure 5:
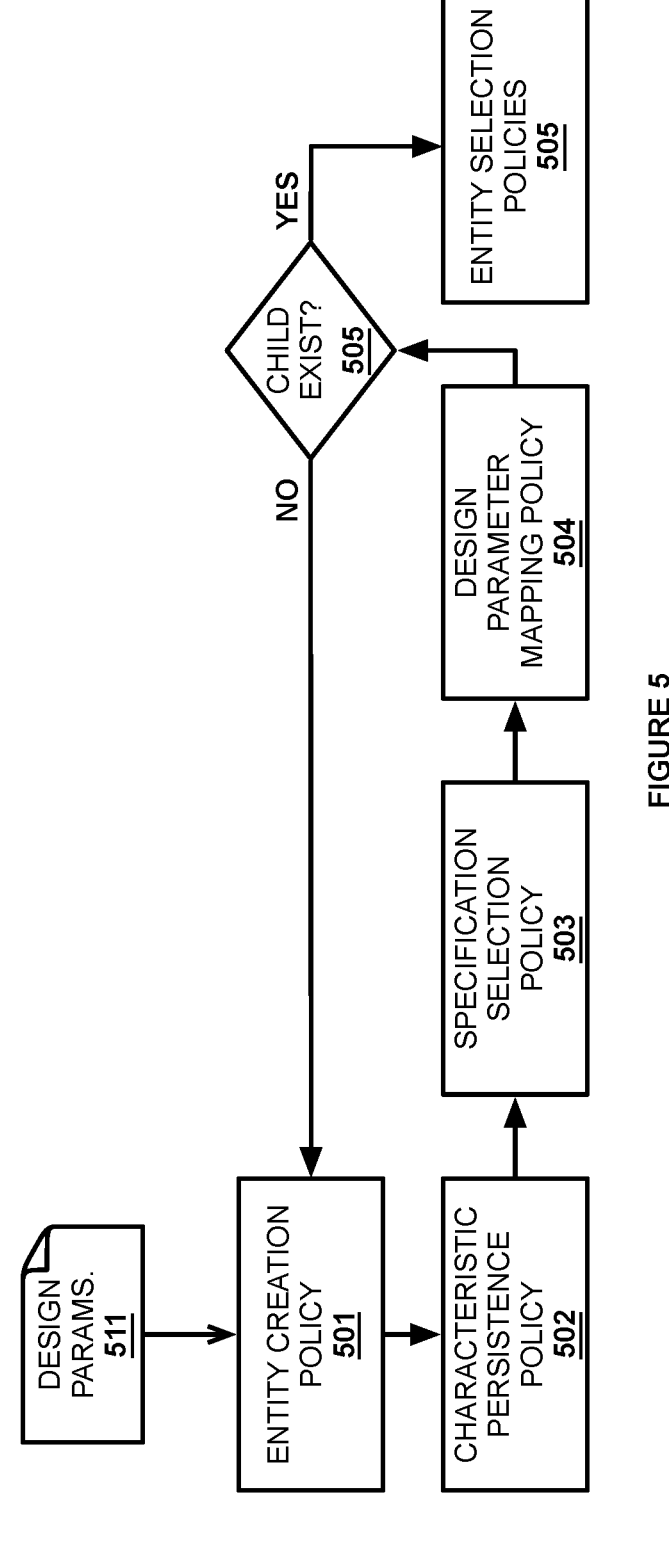
FIG. 5 illustrates an operational scenario for designing and providing a communication service.

FIG. 5 illustrates operational scenario 500 for designing and providing a communication service. Operational scenario 500 in an example for how service designer 101 may create a service design in accordance with steps 202 and 203 of operation 200. Service design parameters 511 are example service design parameters service designer 101 may receive from user system 103. Operational scenario 500 provides example policies that may be included in service catalog 121 to enable service designer 101 to create a service design.

On a first iteration of policy application in operational scenario 500, the service design has no nodes. Thus, entity creation policy 501 is applied to service design parameters 511 to create a root node to represent a top-level entity. Service design parameters 511 include specifications for a service being requested with service design parameters 511. The specifications may have been received by user system 103 or its user from a service order requesting the service. The root node created by entity creation policy 501 corresponds to the service being requested.

Once the root node has been created, characteristic persistence policy 502 is applied to service design parameters 511. Characteristic persistence policy 502 indicates which of service design parameters 511 should persists as characteristics on the created node. Not all of service design parameters 511 are relevant for persistence on a given node. Rather, a parameter may be relevant to a node elsewhere on the path of the service design. For instance, a customer may request a static IP address and that particular parameter may not be relevant for the created node. Also, in some examples, a design parameter may need to be transformed before persisted as a characteristic of the created node. For example, a lookup may need to be performed to retrieve a characteristic corresponding to a particular design parameter. Using the static IP address mentioned above, service designer 101 may lookup available static IP addresses so that one can be assigned as a characteristic (presuming the created node is a node for which the characteristic should persist).

Service designer 101 further applies specification selection policy 503 to service design parameters 511. Specification selection policy 503 describes the possible specification options that can be placed on a component of the node. Specification selection policy 503 identifies the specification of a child entity that should be selected at a given component for the service order. Design Parameter Mapping policy 504 is applied by service designer 101 to the selected specification to identify which of service design parameters 511 will be used to design the child entity of the selected specification. In an example, a broadband internet customer facing service node may include an access component that corresponds to a technology for accessing the internet. Specification selection policy 503 may define minimum and maximum values that correspond to respective access technologies. When service design parameters 511 indicate one of the defined minimum and maximum values, service designer 101 uses specification selection policy 503 to determine an access technology to use. Service designer 101 further uses design parameter mapping policy 504 to identify that the minimum and maximum values should be passed to a node with the determined access technology.

Service designer 101 determines whether the child node determined above already exists in decision block 505. If the child node exists, then entity selection policies 505 indicate which node should be select as the child in the service design. If a child node does not exist, then service designer 101 returns to using entity creation policy 501 to create a new child node branching from the previously created node. Continuing the access technology example from above, entity creation policy 501 may indicate that a node should be created corresponding to the particular access technology. The process repeats until no new children are identified (i.e., the service design has reached a leaf node). In some examples, multiple child nodes may be identified for selection or creation and operational scenario 500 may be performed with respect to each of those child nodes.

Figure 6:
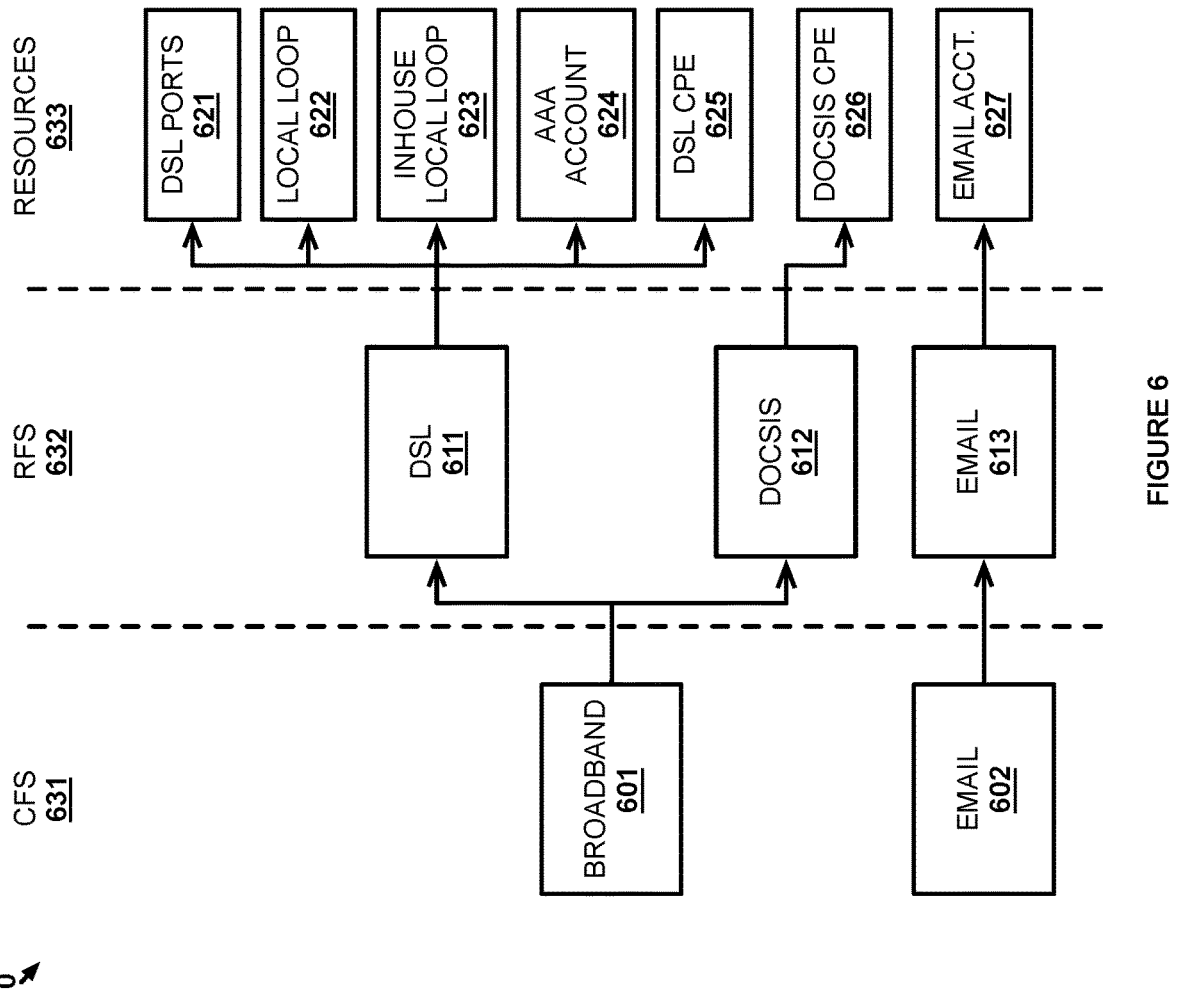
FIG. 6 illustrates an operational scenario for designing and providing a communication service.

FIG. 6 illustrates operational scenario 600 for designing and providing a communication service. Operational scenario 600 is an example service catalog with exemplary services and resources. The service catalog includes customer facing services 631, resource facing services 632, and resources 633. The service catalog includes two customer facing services 631, broadband service 601 and email service 602, three resource facing services 632, and resources 633. Like service catalog 300 above, the service catalog of operational scenario 600 represents possible service design paths available from communication service provider 131.

In operational scenario 600, communication service provider 131 has two services available to customers. One service is broadband internet access, and another is email. A customer may contact communication service provider 131 to request either or both services. A service order may be created for a customer service request and the service order indicates what services the customer desires. The service order may be created by a human representative of communication service provider 131, by an automated system (e.g., a web order form completed by the customer), or may be created in some other manner. Parameters from the service order are included in service design parameters for designing the requested service. Additional service design parameters may be included by a human representative from communication service provider 131, from default parameters, or from some other source.

In one example, the service order is for broadband internet access. Service design parameters for the service are received by service designer 101 and operational scenario 500 occurs to generate the service design. In this example, a node for broadband access 601 is created as the root node for the service design. Depending on the service design parameters, operational scenario 500 creates either a node for digital subscriber line (DSL) 611 or Data Over Cable Service Interface Specification (DOCSIS) 612 is created. Creation of DSL 611 or DOCSIS 612 may be depending on speed requirements, quality of service requirements, or other factors indicated in the service design parameters. DSL 611 and DOCSIS 612 are resource facing services 632 because they face those of resources 633 that will provide the requested broadband internet access service.

If DSL 611 is created, then operational scenario 500 will trigger creation and configuration of nodes for DSL ports 621, local loop 622, inhouse local loop 623, Authentication Authorization and Accounting (AAA) account 624, and DSL customer premises equipment (CPE) 625. Other nodes may also be created or selected in other scenarios. If DOCSIS 612 is created then operational scenario 500 will trigger creation of a node for DOCSIS CPE 626, although, other node may also be created or selected in other scenarios.

If the customer requests an email service, then operational scenario 500 creates email service 602 as the customer facing service. A similar resource facing service, email service 613, is created to branch from email service 602. Then, from email service 613, a node for email account 627 is created to configure an email account for the requested email service. In some examples, if a customer orders both broadband internet access and email, the same service design may incorporate both a path from broadband access 601 and email service 602. Alternatively, two respective service designs may be created for the requested services.

FIG. 7 illustrates a computing system 700 that is representative of any system or collection of systems in which the various processes, systems, programs, services, and scenarios disclosed herein may be implemented. Examples of computing system 700 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof. It should be understood virtualized components are executing on physical hardware like that of computing system 700.

Computing system 700 may be implemented as a single apparatus, system, or device or may be implemented in a distributed manner as multiple apparatuses, systems, or devices. Computing system 700 may include, but is not limited to, processing system 715, storage system 705, software 725, communication interface system 710, and user interface system 720. Processing system 715 may be operatively coupled with storage system 705, communication interface system 710, and user interface system 720.

Processing system 715 may load and execute software 725 from storage system 705. Software 725 may include and implement service designer 730, which may be representative of any of the operations for designing and providing a communication service (e.g., operation 200). Accordingly, computing system 700 may be service designer 101 or may be a host system for a virtualized example of service designer 101. Computing system 700 may also represent other computing systems described herein, such as resources 102, user system 103, and customer equipment 104—including combinations thereof. When executed by processing system 715, software 725 may direct processing system 715 to operate as described herein for at least the various processes, operational scenarios, and sequences discussed in the foregoing implementations. Computing system 700 may optionally include additional devices, features, or functionality not discussed for purposes of brevity.

In some embodiments, processing system 715 may comprise a micro-processor and other circuitry that retrieves and executes software 725 from storage system 705. Processing system 715 may be implemented within a single processing device but may also be distributed across multiple processing devices or sub-systems that cooperate in executing program instructions. Examples of processing system 715 may include general purpose central processing units, graphical processing units, application specific processors, and logic devices, as well as any other type of processing device, combinations, or variations thereof.

Storage system 705 may comprise any memory device or computer readable storage media readable by processing system 715 and capable of storing software 725. Storage system 705 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 705 may also include computer readable communication media over which at least some of software 725 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 715 or possibly other systems.

Software 725 (including process 730 among other functions) may be implemented in program instructions that, when executed by processing system 715, direct processing system 715 to operate as described with respect to the various operational scenarios, sequences, and processes illustrated herein. For example, software 725 may include program instructions for receiving service design parameters for a communication service provided by the communication service provider, identifying a root node in a service design catalog corresponding to the service design parameters, creating a service design by traversing from the root node through one or more subsequent child nodes defined by the service design catalog based on the service design parameters until one or more leaf nodes indicated by the service design catalog are reached, configuring one or more resource facing services and resources corresponding to nodes traversed in the service design in accordance with the service design, and providing the communication service via the resources after configuration.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 725 may include additional processes, programs, or components, such as operating system software, virtualization software, or other application software. Software 725 may also comprise firmware or some other form of machine-readable processing instructions executable by processing system 715.

In general, software 725 may, when loaded into processing system 715 and executed, transform a suitable apparatus, system, or device (of which computing system 700 is representative) overall from a general-purpose computing system into a special-purpose computing system customized to act, for example, as a slice breather or the like as described herein. Indeed, encoding software 725 on storage system 705 may transform the physical structure of storage system 705. The specific transformation of the physical structure may depend on various factors in different implementations of this description. Examples of such factors may include, but are not limited to, the technology used to implement the storage media of storage system 705 and whether the computer-storage media are characterized as primary or secondary storage, as well as other factors.

For example, if the computer readable storage media are implemented as semiconductor-based memory, software 725 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 710 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the only system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for providing communication services provided from a communication service provider, the method comprising:

providing a plurality of communication services to a plurality of customers over a network from a plurality of resources, including one or more computing systems and/or one or more network elements, of the communication service provider;

receiving service design parameters for a communication service of the plurality of communication services;

identifying a root node in a service design catalog corresponding to the service design parameters;

creating a service design by traversing from the root node through one or more subsequent child nodes defined by the service design catalog based on the service design parameters until one or more leaf nodes indicated by the service design catalog are reached, wherein each child node of the one or more subsequent child nodes is selected relative to one or more other potential child nodes to satisfy a parameter of the service design parameters and represents a resource of the plurality of resources, wherein each of the one or more other potential child nodes satisfies a different possible parameter from the parameter included in the service design parameters and represents a different resource of the plurality of resources;

configuring one or more resource facing services and resources of the plurality of resources represented by nodes traversed in the service design in accordance with the service design; and providing the communication service to customer equipment of a customer of the plurality of customers.

2. The method of claim 1, wherein the root node corresponds to a customer facing service (CFS) comprising a high-level representation of the communication service.

3. The method of claim 2, wherein a child node of the root node in the service design corresponds to a resource facing service (RFS) comprising a set of the resources for providing the communication service.

4. The method of claim 1, wherein design policies of the service design catalog corresponding to the root node and the one or more subsequent child nodes define which of available subsequent nodes should be selected during traversal.

5. The method of claim 1, comprising:

receiving design policies of the service design catalog from a user.

6. The method of claim 1, wherein identifying the root node comprises:

creating the root node when the root node does not already exist in the service design.

7. The method of claim 1, wherein creating the service design comprises:

determining a set of the service design parameters should persist at a parent node;

selecting one or more child nodes of the parent node to which the set of the service design parameters should pass; and passing the set of the service design parameters to the one or more child nodes.

8. The method of claim 7, wherein selecting the one or more child nodes comprises:

creating a child node when the child node does not already exist in the service design.

9. The method of claim 1, comprising:

presenting the service design to a user.

10. The method of claim 9, comprising:

after presenting the service design to the user, receiving an instruction from the user to provide the communication service, wherein the communication service is provided in response to the instruction.

11. A system to provide communication services from a communication service provider, the system comprising:

a plurality of resources, including one or more computing systems and/or one or more network elements, of the communication service provider configured to provide a plurality of communication services to a plurality of customers over a network;

a service designer computing system lined to the plurality of resources and configured to:

receive service design parameters for a communication service provided by the communication service provider;

identify a root node in a service design catalog corresponding to the service design parameters;

create a service design by traversing from the root node through one or more subsequent child nodes defined by the service design catalog based on the service design parameters until one or more leaf nodes indicated by the service design catalog are reached, wherein each child node of the one or more subsequent child nodes is selected relative to one or more other potential child nodes to satisfy a parameter of the service design parameters and represents a resource of the plurality of resources, wherein each of the one or more other potential child nodes satisfies a different possible parameter from the parameter included in the service design parameters and represents a different resource of the plurality of resources; and configure one or more resource facing services and resources represented by nodes traversed in the service design in accordance with the service design; and the plurality of resources configured to provide the communication service to customer equipment of a customer of the plurality of customers.

12. The system of claim 11, wherein the root node corresponds to a customer facing service (CFS) comprising a high-level representation of the communication service.

13. The system of claim 12, wherein a child node of the root node in the service design corresponds to a resource facing service (RFS) comprising a set of the resources for providing the communication service.

14. The system of claim 11, wherein design policies of the service design catalog corresponding to the root node and the one or more subsequent child nodes define which of available subsequent nodes should be selected during traversal.

15. The system of claim 11, comprising:

the service designer computing system configured to receive design policies of the service design catalog from a user.

16. The system of claim 11, wherein the service designer computing system configured to identify the root node comprises:

the service designer computing system configured to create the root node when the root node does not already exist in the service design.

17. The system of claim 11, wherein the service designer computing system configured to create the service design comprises:

the service designer computing system configured to:

determine a set of the service design parameters should persist at a parent node;

select one or more child nodes of the parent node to which the set of the service design parameters should pass; and pass the set of the service design parameters to the one or more child nodes.

18. The system of claim 17, wherein the service designer computing system configured to select the one or more child nodes comprises:

the service designer computing system configured to create a child node when the child node does not already exist in the service design.

19. The system of claim 11, comprising:

the service designer computing system configured to:

present the service design to a user; and after the service design is presented to the user, receive an instruction from the user to provide the communication service, wherein the communication service is provided in response to the instruction.

20. A system for a resource that provides communication services from a communication service provider to a plurality of customers, the system comprising:

a communication interface of the resource configured to receive a configuration from a service design computing system, wherein the service design computing system:

receives service design parameters for a communication service provided by the communication service provider;

identifies a root node in a service design catalog corresponding to the service design parameters;

creates a service design by traversing from the root node through one or more subsequent child nodes defined by the service design catalog based on the service design parameters until one or more leaf nodes indicated by the service design catalog are reached, wherein a child node of the one or more subsequent child nodes is selected relative to one or more other potential child nodes to satisfy a parameter of the service design parameters, wherein each of the one or more other potential child nodes satisfies a different possible parameter from the parameter included in the service design parameters; and configures one or more resource facing services and resources, including the resource, represented by nodes traversed in the service design in accordance with the service design; and a processing system configured to provide the communication service via the communication interface to customer equipment of a customer of the plurality of customers.

* * * * *